Nov. 3, 1959     D. F. CARIS     2,910,974
SPEED RESPONSIVE CONTROL DEVICE
Filed Dec. 20, 1954
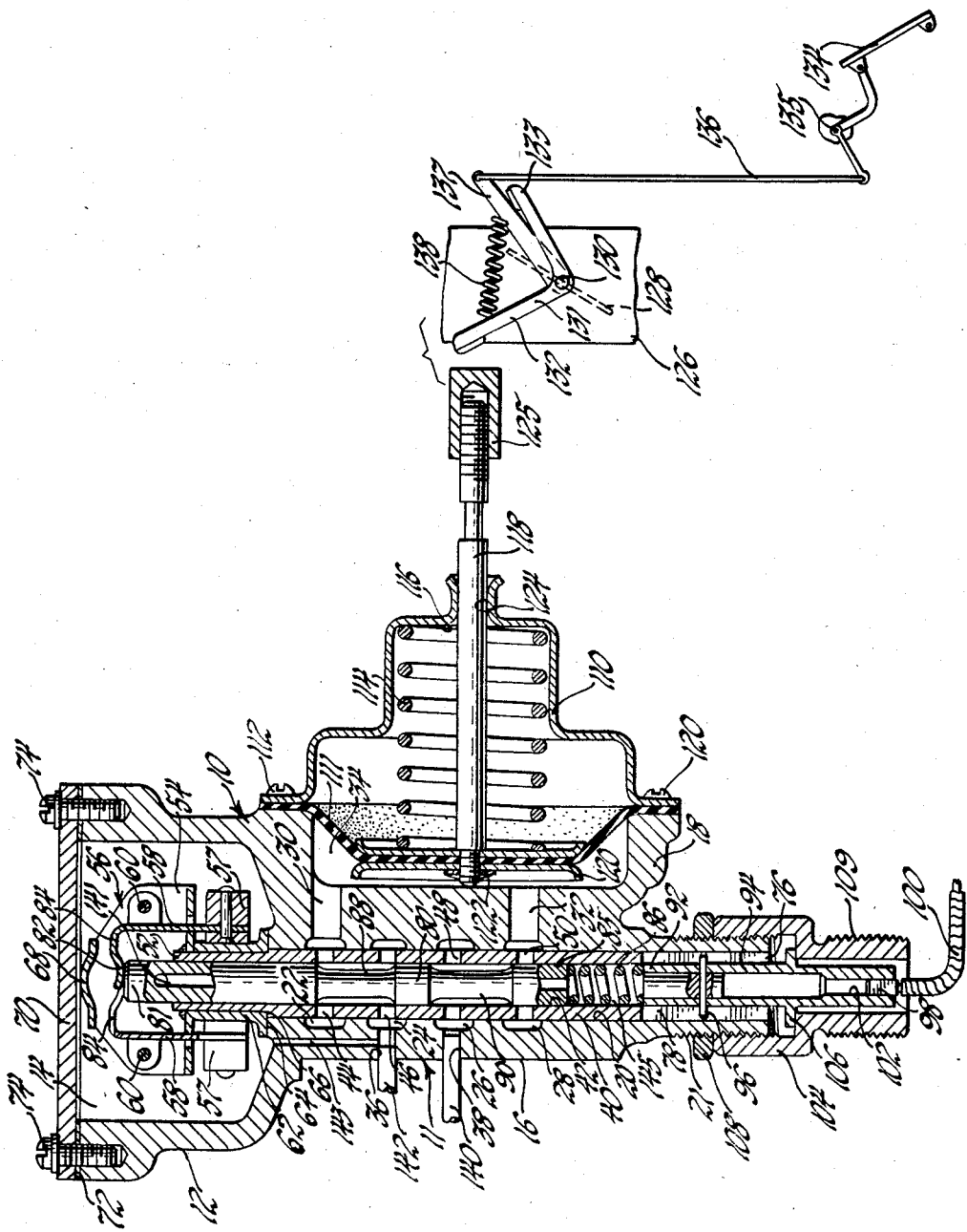
INVENTOR
*Darl F. Caris*
BY
*S. D. Burch*
ATTORNEY United States Patent Office 2,910,974
Patented Nov. 3, 1959

2,910,974

SPEED RESPONSIVE CONTROL DEVICE

Darl F. Caris, Dearborn, Mich., assignor to General Motors Corporation, Detroit, Mich., a corporation of Delaware Application December 20, 1954, Serial No. 476,313

2 Claims. (Cl. 123—103)

This invention relates to speed control devices for engine driven vehicles and the like, and more particularly to a speed control device whihc is activated at a predetermined vehicle speed by engine oil pressure.

The great number of different transmissions now employed in motor vehicles, many of them requiring different ranges of power from the engine for their safe and efficient operation, make it desirable to provide a simple standard vehicle speed control device which may be used with any vehicle and which does not interfere with normal engine performance until the predetermined vehicle speed is reached.

Accordingly, an object of the invention is to provide a simple compact speed control device which will control vehicle speed at any desired value without in any way interfering with the performance of the engine or the fuel economy of the vehicle.

Another object of the invention is to provide a device which will permit the engine to speed up to the requirements of any type of transmission until the vehicle control speed is reached, at which time the device will close the engine throttle valve until the engine delivers road load at that speed.

Another object of the invention is to provide such a device which is positively activated by engine oil pressure, thus eliminating the need of an additional fluid pump or other activating means of any kind.

Still another object of the invention is to provide such a device in which the concentric valve and drive mechanisms in which all internal pressures are balanced in order to reduce the operating friction of the device. This reduces the tendency of the device to hunt in assuming a final operative position at which the engine delivers road load at the predetermined vehicle speed.

In the drawings:

The figure is a vertical cross-sectional view, with portions thereof in elevation, illustrating a speed control device embodying the invention. The right-hand portion of the figure is a schematic illustration of a throttle valve and linkage with which the device may be employed.

Referring to the drawings in greater detail, a preferred embodiment of a device 10 embodying the invention may include a generally cylindrical housing 11 having an enlarged hollow upper portion 12 providing a governor cylindrical chamber 14 and a lower portion 16 of reduced diameter having an annular diagram housing 18 extending laterally therefrom. The housing 11 is shown as being formed in one piece, but it may be formed in a number of pieces, if so desired, for convenience in machining and assembly. The lower portion 16 is formed along the length thereof to provide an axially disposed cylindrical passage 20 communicating with the cylindrical chamber 14, and at the free end thereof to provide an externally threaded section 21. Spaced annular grooves 22, 24, 26 and 28 are formed in the walls defining the cylindrical passage 20. Passages 30 and 32 are formed to provide communication between the annular chamber 34 in the diagram housing 18 and the annular grooves 22 and 28, respectively. Passages 36 and 38 are formed to provide communication between the annular grooves 24 and 26 and the exterior of the lower portion 16. It will be noted that the top wall of passage 30 is flush with the top wall of the chamber 34 in order to prevent the entrapment of air in the chamber 34.

Disposed within the cylindrical passage 20 is a hollow sleeve member 40 having an axial bore 42 extending through the entire length thereof and the laterally extending passages 44, 46, 48 and 50 providing constant communication between the axial bore 42 and the annular grooves 22, 24, 26 and 28 respectively, even when sleeve 40 is made to rotate by means to be later described in detail.

The upper end 52 of sleeve 40 may be welded or otherwise secured to the support member 54 of a typical centrifugal governor assembly 56. The weights 57, which are shown in the down or inoperative position, are secured to the arms 58 which are pivotally mounted on the rotatable support member 54 by means of pins 60. An annular bushing or bearing 62 spaces the support member 54 above the aligned shoulders 64 and 66 of the housing 10 and the sleeve 40 respectively. The spherical formation 68 at the top of the support member 54 is urged downwardly by the housing cover 70 to maintain the governor assembly 56 and the sleeve 40 in place as shown by the figure. The cover 70 may be sealed by a gasket 72 and secured by the screws 74. The lower end of the sleeve 40 terminates at 76 and is provided with a slot 78 passing through a diameter thereof.

Disposed within the sleeve 40 is a shaft or valve 80 whose upper end 81 is in constant contact with the cam ends 82 on the laterally projecting portions 84 of the weight-carrying arms 58 and whose lower end 85 is in constant contact with the upper end of the helical spring 86. The valve 80 is formed to provide portions 88 and 90 of reduced diameter, the portion 88 being of sufficient length to provide communication in the inoperative position of the device shown between the passages 44 and 46. The portion 90 is of sufficient length to provide communication in the operative position of the device to be described between the passages 48 and 50. The valve 80 is maintained in constant contact with the cam ends 82 by means of the helical spring 86 which is compressed between the lower valve end 85 and the upper end 92 of the sleeve driving member 94. It will be noted that the pin 96 passing through the member 94 extends at either end thereof into the slot 78 to lock the sleeve 40 to the member 94 for rotation therewith. The member 94 may be made to rotate by any suitable means such as the square end 98 on the rotating cable 100 fitting into the square hole 102 in the lower end of the member 94. The tension on the spring 86 may be adjusted by means of the adjusting screw 104 which bears on the annular shoulder 106 of the member 94 and which may be locked in any position by the lock or jam nut 108. The external threads 109 of the adjusting screw 104 may be used to secure the device 10 to an engine.

Secured to the periphery of the diaphragm housing 18 by means of a suitable cover 110 and screws 112 is a flexible diaphragm 111 which extends across the chamber 34 and which, in the inoperative position of the device shown, is depressed into the chamber 34 by means of a suitable helical spring 114 bearing at its other end against the shoulder 116 of the cover 110. A rod or shaft 118 is secured at one end thereof to the center of the diaphragm 111 by any suitable means such as the plates 120 and the fastener 122. The shaft passes through the guide opening 124 in the cover 110 and is provided at the other end thereof with an adjustable bumper 125. A throttle and linkage with which the device 10 may be employed may comprise an induction passage 126 having a butterfly valve 128 mounted to rotate with the pin 130. The bell crank 131 having the arms 132 and 133 is mounted for rotation with the pin 130. Depressing the foot pedal 134, which is pivoted at 135, forces the link 136 upwardly and the lever 137 in a counterclockwise direction. The compression spring 138, which normally positions lever 137 against arm 133, causes the bell crank 131 and the butterfly valve 128 to also rotate in a counterclockwise direction to open the throttle. However, when the bumper 125 on the shaft 118 moves to the right at the predetermined vehicle speed to engage arm 132, the bell crank 131 is moved in a clockwise direction against the force of the spring 138 to close the throttle to predetermined vehicle speed position independently of the position of the foot pedal 134. Thus, below the predetermined vehicle speed, normal engine performance is permitted.

It has already been pointed out that the proposed device 10 is operated by engine oil pressure. For this purpose, the oil supply tube 140 fitted in passage 38 leads from the engine oil pump and the oil return tube 142 fitted in passage 36 leads to the engine oil sump. Thus, so long as there is engine oil pressure, oil is supplied through the tube 140, into the annular groove 26 and around the portion 90 of shaft 80. In this manner, all pressures around the valve 80 are radially balanced within sleeve 40, and all pressures around the sleeve 40 are radially balanced within passage 20. This reduces friction in the device and in the operation of the valve. However, in both the inoperative position of the device shown and the operative position of the device below critical vehicle speed, the oil cannot enter passage 32 by reason of its being blocked off by the valve 80. The device 10 does not operate at all, regardless of whether or not the engine is running, until the vehicle is moving, since the cable 100 is mounted at the driven end thereof to rotate with some part of the final drive, such as the driven end of the transmission.

Starting from a standstill and approaching the predetermined vehicle speed, the cable 100 drives the sleeve 40 faster and faster. It will be apparent that centrifugal force will cause the weights 57 to rise higher and higher and the cam ends 82 to force the valve 80 downwardly farther and farther against the force of the spring 86. Passages 141 and 143 provide communication between the closed spring cavity 145 and the return line 142 to maintain atmospheric pressure in the cavity 145 so that valve 80 may move freely. In this manner, the portion 90 of reduced diameter approaches and finally assumes a position necessary to provide initial and then full communication between passages 48 and 50, and thus between passages 38 and 50, so that engine oil under pressure from tube 140 may enter the diaphragm chamber 34. The engine oil pressure may be presumed to be constant, but the greater the acceleration of the vehicle, the faster the valve 80 is depressed to a position of full communication between the passages 48 and 50. It will be apparent that the force of the spring 86 determines the force required to lower the valve 80, and thus the control speed at which the device becomes operative.

It will be noted that in the inoperative position of the device 10, the passages 44 and 46, the grooves 22 and 24 and the portion 88 provide communication between passages 30 and 36 so that any oil pressure in the chamber 34 is relieved through tube 142 to the oil sump. However, as the vehicle speed approaches the predetermined vehicle speed, the valve 80 moves downwardly to block the passage 44. Finally, at the predetermined speed of the vehicle, engine oil under pressure fills the chamber 34 and forces the diaphragm 111 outwardly so that the shaft 118 moves the bell crank 131 clockwise against the tension of spring 138 and independently of the foot pedal 134. Because the valve 80 and the sleeve 40 are radially balanced, the device will adjust itself so that the throttle is set to road load at the predetermined vehicle speed in a minimum time or with minimum hunt.

As the speed of the vehicle decreases, the weights 57 move towards the shaft to relieve the downward force on the shaft and the valve 80 is also urged upwardly by spring 86, which is always in compression. This begins to close passages 28 and 50 and to open passages 22 and 44 so that oil may escape from chamber 34 and diaphragm 111 may move inwardly under pressure from spring 114 which is also always under compression. Again, the rate of movement of the shaft 80 and the opening and closing of the various passages is dependent solely upon the vehicle speed and to that extent independent of the engine.

It is apparent from the above specification and drawings that there has been provided a simple compact speed control device activated by engine oil pressure to control the speed of any vehicle at any desired value without interfering in any way with the performance of the engine and fuel economy. The valve and drive mechanisms are hydraulically self-balanced to reduce the tendency of such a device to hunt.

What is claimed is:

1. Throttle-limiting mechanism for an internal combustion engine, said mechanism being responsive to a speed developed by said engine and comprising, a housing having an axially extending bore and fluid inlet and exhaust and governor passages formed therein connecting with said bore and a first chamber formed at one end of said bore and a second chamber formed along one side of said bore, said second chamber being connected with said governor passages to permit governor fluid flow between said bore and said second chamber, a diaphragm defining one wall of said second chamber and responsive to governor fluid pressure therein, a rod connected with and actuated by said diaphragm, a rotatable sleeve received within said bore and having at least two ports extending therethrough and aligned with each of said passages, said sleeve being driven by means having a rotatable speed developed by the internal combustion engine and having speed responsive centrifugal means secured to one end and received within said first chamber, a valve received within and rotating with said sleeve and having circumferential lands and grooves corresponding with said ports and said passages in controlling relation, said centrifugal means engaging one end of and acting on said valve to move said valve axially in said sleeve whereby fluid pressure in said second chamber is a function of the rotatable speed of said centrifugal means, and adjustable spring means within and rotatable with said sleeve adjacent the end opposite said centrifugal means and acting against the other end of said valve for setting a predetermined speed whereby said rod is moved to a throttle-limiting position by said diaphragm at said predetermined speed.

2. In an automotive vehicle having a throttle control member, a stop member positioned in the path of said control member and engageable by said control member when said control member is moved to increase the speed of the vehicle, a fluid servo connected with said stop member for moving said member in the path of said control member to adjust the point of engagement of said stop member by said control member and resist movement of said control member beyond said engagement point in the vehicle speed increasing direction, a housing for said servo having servo control means therein and control passages connecting said servo and said control means and inlet and exhaust passages, said servo control means comprising a rotatable sleeve received within said housing and having diametrically extending ports aligned with said control and inlet and exhaust passages, a speed valve reciprocably received in said sleeve and intersecting said ports and passages and being operable when moved in one direction to close said exhaust passage and to open said inlet passage and in the other direction to open said exhaust passage and to close said inlet passage, means for rotatably driving one end of said sleeve to rotate said sleeve, speed responsive means secured to the other end of said sleeve and acting on one end of said valve for moving said valve to so open and close said passages, and adjustable spring means received in said sleeve adjacent said sleeve one end and engaging said valve and urging said valve to oppose said speed responsive means, said spring means having spring reaction means adjustable externally of said housing and connected with said sleeve to be rotatably driven therewith whereby said spring means and said valve rotate with said sleeve.

References Cited in the file of this patent

UNITED STATES PATENTS

| | | |
|---|---|---|
| 1,843,960 | Sticelber | Feb. 9, 1932 |
| 2,020,847 | Mitereff | Nov. 12, 1935 |
| 2,157,367 | Warner | May 9, 1939 |
| 2,157,472 | Bellis | May 9, 1939 |
| 2,248,314 | Vatter | July 8, 1941 |
| 2,361,206 | Hoppe | Oct. 24, 1944 |
| 2,364,817 | Reggio | Dec. 12, 1944 |
| 2,444,139 | Mallory | June 29, 1948 |
| 2,452,088 | Whitehead | Oct. 26, 1948 |
| 2,453,377 | Lovit | Nov. 9, 1948 |
| 2,478,752 | Drake | Aug. 9, 1949 |
| 2,500,882 | Staples | Mar. 14, 1950 |
| 2,516,723 | Rodeck et al. | July 25, 1950 |
| 2,602,655 | Gesner | July 8, 1952 |
| 2,623,600 | Rhines et al. | Dec. 30, 1952 |
| 2,664,868 | Lautzenhiser | Jan. 5, 1954 |
| 2,669,973 | Parker | Feb. 23, 1954 |
| 2,734,490 | Moulton | Feb. 14, 1956 |
| 2,762,384 | Rosenberger | Sept. 11, 1956 |

FOREIGN PATENTS

| | | |
|---|---|---|
| 656,845 | France | Jan. 5, 1929 |
| 722,577 | France | Jan. 4, 1932 |